United States Patent [19]

King

[11] 4,074,108

[45] Feb. 14, 1978

[54] COUNTERTOP DISPLAY WARMER

[75] Inventor: James D. King, Dayton, Ohio

[73] Assignee: Henny Penny Corporation, Eaton, Ohio

[21] Appl. No.: 722,474

[22] Filed: Sept. 13, 1976

[51] Int. Cl.² ............................................. H05B 1/00
[52] U.S. Cl. .................................... 219/214; 312/236
[58] Field of Search ............... 219/214, 354, 405, 411; 34/88, 227; 312/114, 236; 99/474, 341; 222/146 HE

[56] References Cited

U.S. PATENT DOCUMENTS

| 2,229,911 | 1/1941 | Anderson | 34/88 X |
| 2,263,057 | 11/1941 | Urbanek | 34/88 |
| 2,458,190 | 1/1949 | Newburger | 219/214 |
| 2,575,643 | 11/1951 | Tamsen | 34/88 X |
| 3,327,092 | 6/1967 | Wilson | 219/214 |
| 3,860,306 | 1/1975 | Kenyon | 312/114 X |
| 3,999,475 | 12/1976 | Roderick | 99/474 |

Primary Examiner—C. L. Albritton
Attorney, Agent, or Firm—Melville, Strasser, Foster & Hoffman

[57] ABSTRACT

An illuminated display warmer for displaying food products while maintaining them at proper serving temperature. The warmer includes glass front and sides, a base providing a flat heating surface, and a ceiling from which is suspended a radiant heater for warming the product in the warmer chamber. Separate convective air flow paths ventilate the warmer chamber and provide for a low external surface temperature. The warmer is particularly adapted to be mounted on a countertop. Recessing of a low profile base heater permits such mounting without danger of burning or scorching of the countertop.

10 Claims, 3 Drawing Figures

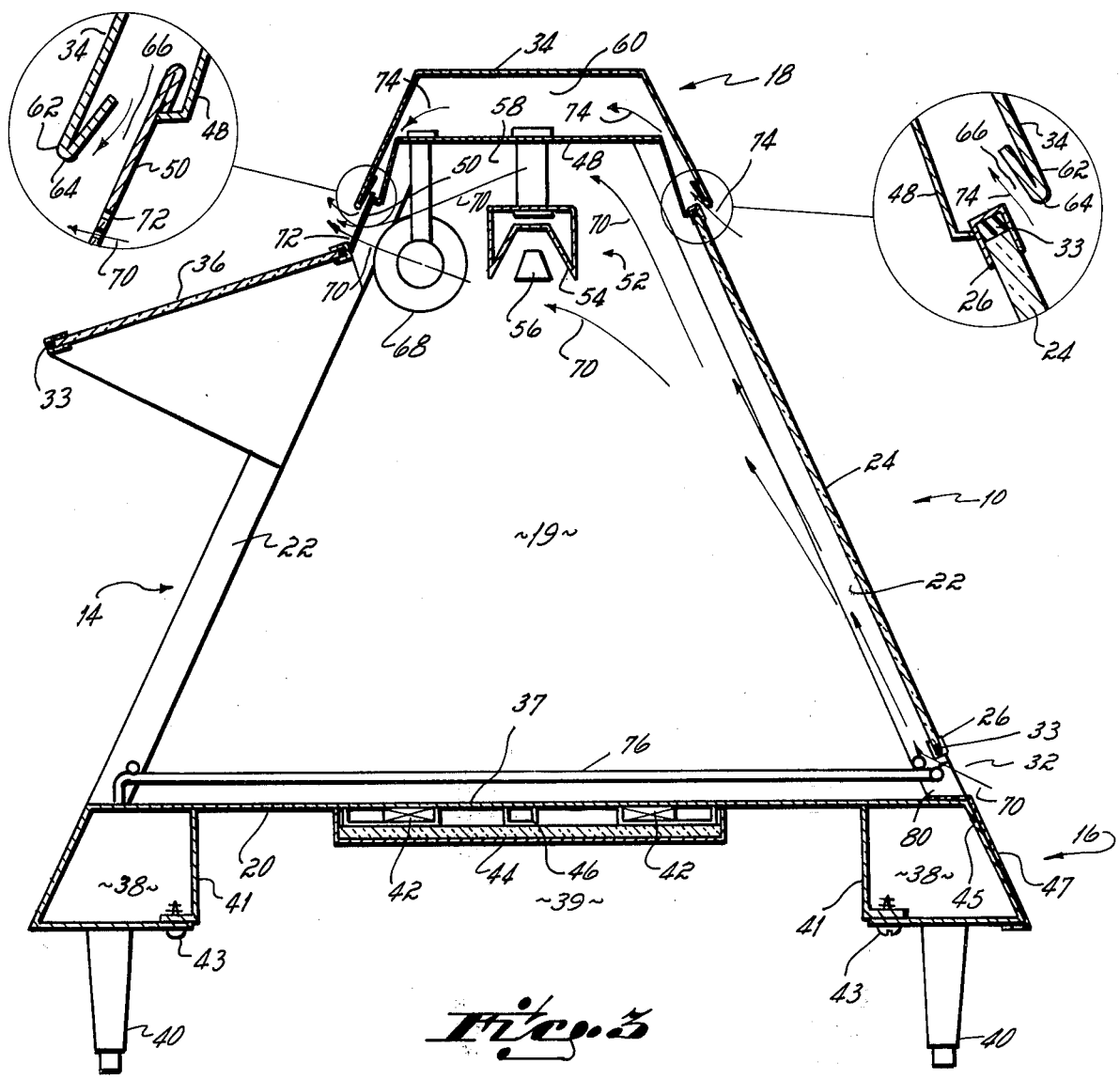

COUNTERTOP DISPLAY WARMER

BACKGROUND OF THE INVENTION

This invention relates to a display warmer for displaying food products and, more particularly, to a display warmer for mounting on a countertop or the like in full view of customers.

In food service establishments, particularly those of the fast-food type wherein a variety of freshly prepared foods are immediately available to customers, it is desirable to be able to fully display these foods to the customers while maintaining them at proper serving temperature. A unit for displaying such foods must be able to maintain the food at proper serving temperature, i.e., in excess of 140° F. However, such a unit must also be capable of being placed in full view of and close to the customer for full effect, e.g., on a table, cabinet, countertop, or the like, and, therefore, must provide safeguards against the hazards of burn injuries resulting from high external temperatures of the warmer. Furthermore, the warmer must have the flexibility to accommodate a variety of foods and be movable from place to place. Moreover, the warmer must have a minimum of obstructions that can impair cleaning and maintenance and must offer sanitary protection while providing full view of the hot foods.

It is an object of the present invention to provide a table, cabinet, or countertop mounted display warmer capable of maintaining the food at a proper serving temperature while providing a full view of the hot foods.

It is another object of this invention to provide a display warmer having a low profile recessed base heater permitting mounting of the warmer on a countertop or the like without danger of burning or scorching of the underlying surface.

It is another object of this invention to provide a countertop display warmer wherein heat transfer to the external surfaces of the warmer is minimized to safeguard against possible burn injuries.

It is another object of this invention to provide a countertop display warmer which provides maximum sanitary protection while providing full view of the foods.

It is another object of this invention to provide a countertop display warmer having ventilation paths to prevent fogging or steaming of the display glass and to prevent high external metal temperature.

BRIEF DESCRIPTION OF THE INVENTION

These and other objects of the invention are accomplished by providing a display warmer having transparent front and sides offering maximum visibility of the warmer chamber, a base providing a flat heating surface, and a ceiling forming the top closure of the warmer chamber from which is suspended a radiant heater for warming the product in the warmer chamber. The base is provided with a concave outer surface which receives a low profile heater permitting the warmer to be mounted on a surface, e.g., a countertop, and permitting the heater to be isolated from front and rear conduits formed integrally with the base.

The back of the warmer is open to permit access to the warmer chamber by the operator. A coated incandescent light bulb suspended from the ceiling illuminates the warmer chamber. The base and radiant heaters are independently controllable whereby the warmer can accommodate a variety of food products.

The ceiling is provided with a canopy defining an air space therebetween through which convective air circulates to minimize heat transfer from the ceiling to the canopy thereby providing for a low external surface temperature. A separate ventilation path generally in an upward and rearward direction prevents fogging or steaming of the display glass.

Thermal conduction interruption openings are located in the front surface of the base to control and restrict the transfer of heat thereto to provide for a low external surface temperature.

Other objects and advantages of the invention will be apparent from the following detailed description, reference being had to the accompanying drawings.

BRIEF DESCRIPTION OF THE DRAWINGS

FIG. 3 is a view taken along line 3-3 of FIG. 2.

DETAILED DESCRIPTION OF THE INVENTION

Figure 1:
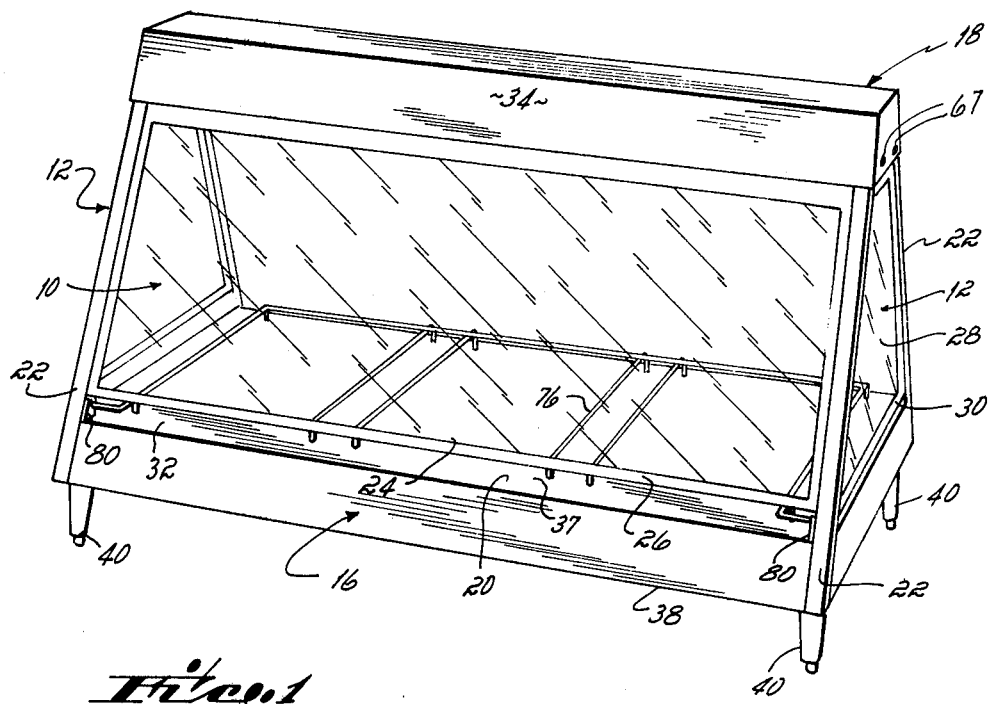
FIG. 1 is a front perspective view of the invention.
Figure 2:
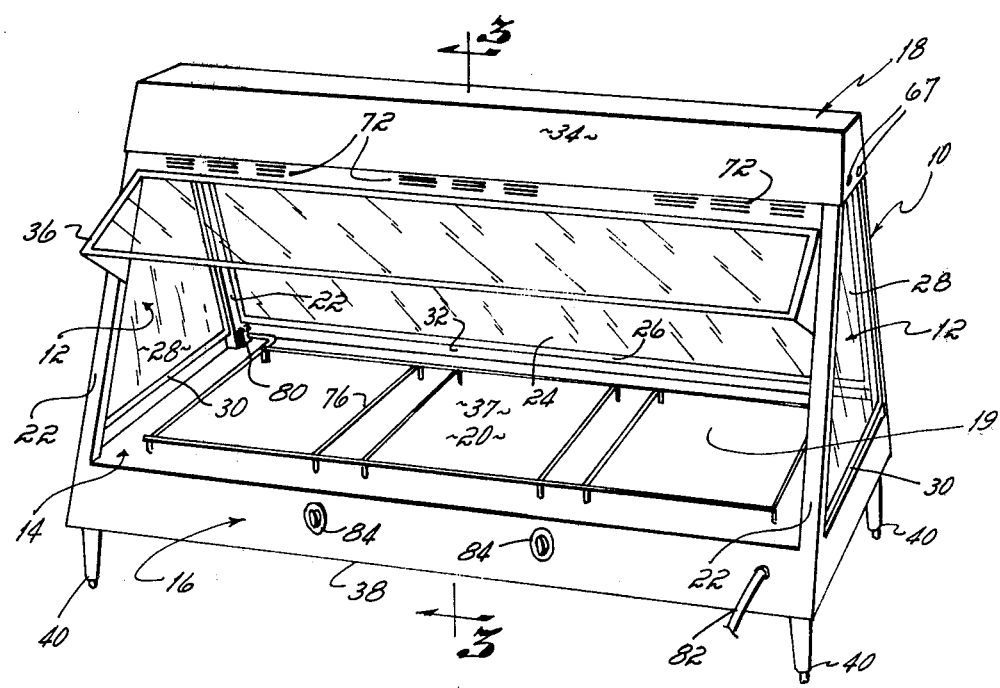
FIG. 2 is a rear perspective view of the invention.

Referring to FIGS. 1 and 2, the warmer includes a transparent, generally slanted front 10 and a pair of transparent, generally trapezoidal-shaped sides 12 to permit a maximum viewing area for the product displayed, and an open rear 14, a base 16, and a top 18 defining a warmer compartment 19. The base 16 of the warmer is constructed of a unitary, sheet metal element 20 which is attached to tubular members 22 forming the sides 12 of the warmer. The front 10 is formed of a glass plate 24 mounted in a metal frame 26 attached to the tubular side members 22. The sides 12 are likewise formed of glass plates 28 mounted in frames 30 attached to the side members 22. Preferably, the glass plates 24 and 28 are mounted in their frames with heat resistant seals 33 (FIG. 3) which allow for expansion, shock or vibration without danger of breaking the glass. A suitable sealing material is "Silastic", a silicone rubber material manufactured by Dow-Corning Company. The glass front 24 extends just short of the base member 20 to provide an opening 32 therebetween extending across the front of the warmer. Mounted on the top of the warmer is a canopy 34. The rear 14 of the warmer is open for access to the interior by the operator for loading and unloading of product and includes a protective sneeze plate 36.

Referring in addition to FIG. 3, the base 16 is constructed of a single piece of sheet metal 20, e.g., aluminum, to provide a smooth, flat heating surface 37 upon which metal pans (not shown) containing the food product sit. The smooth, flat heating surface provides for even temperature distribution and ease of cleaning. The base member 20 is turned downwardly and inwardly at its front and rear edges and is joined to a frame 41, which is L-shaped in cross-section, by means of screws 43 to form a tubular conduit 38 extending around the perimeter of the warmer. The conduit 38 provides a concave opening 39 in the bottom surface of the base 16 providing an air space or cavity below the warmer. This air space permits the warmer to be mounted or installed flat against a countertop with the air space preventing excessive heat that could cause burning or scorching of the countertop. Support legs 40 may, if desired, be attached to the base to further raise the warmer above the countertop. However, the provision of the concave opening 39 permits mounting of the warmer on a countertop even when support legs are not employed.

The base is heated by two metal-sheathed heating elements 42 which are clamped to the underside of the base 20 and covered by a heat insulted cover 44. Between the two metal-sheathed heating elements 42 and generally centrally of the base member 20 is mounted a longitudinally extending U-shaped channel 46. This channel provides rigidity to the base member preventing warping or buckling caused by expansion of the metal when heated. The heating elements 42, channel 46, and cover 44 are configured into a low profile allowing the air space to exist between the cover 44 and the bottom of the conduit 38. Moreover, the conduit 38 is isolated from the heating elements 42 thus providing low ambient temperatures suitable for the installation of electrical wiring and components therein.

Slots 45 are located in the front surface of the base member 20 to control and restrict the transfer of heat from the heating surface 37 to this surface. The slots 45 are so sized and spaced across the front of the warmer to interrupt the flow of heat from the heating surface 37 to provide a relatively low external surface temperature along that portion of the warmer base facing the customer. A vinyl laminate covering 47 is applied over this area to conceal the slots 45 and to provide a decorative appearance.

The top of the warmer includes a ceiling 48 forming a top closure for the warmer chamber 19, which is attached to the front frame 26 and an upper, rear panel 50 and forms the top closure for the warmer chamber 19. The ceiling 48 is designed to join the frame 26 and rear panel 50 along transverse edges rather than a flat face to minimize the surface contact area to the thickness of the metal forming the ceiling thus providing a minimum heat transfer surface between the ceiling and its adjoining structure, reducing the heat loss from the chamber 19 and heat transfer to the exterior of the warmer. In the embodiment illustrated in FIG. 3, the ceiling 48 joins the front frame 26 along a transverse edge of the ceiling and joins the rear panel 50 along a transverse edge of the rear panel.

Suspended from the ceiling 48 is an electric radiant heating unit 52 for heating the food product from above. The heating unit 52 is constructed of a unitized reflector housing 54 and a tubular metal-sheathed radiant heating element 56. The radiant heating unit 52 is suspended from the ceiling thereby defining an air space 58 between the radiant heater unit 52 and the ceiling 48 which provides an air insulation gap as well as an air ventilation path, as will be hereinafter described. Preferably, the radiant heater housing 54 is constructed of a highly reflective material such as polished aluminum. The ceiling 48 is likewise constructed of a reflective material such as polished aluminum to provide a heat reflective inner surface.

Mounted above the ceiling 48 is the canopy 34. The spaced mounting of the canopy 34 from the ceiling 48 provides an air space 60 between the ceiling and the canopy. The canopy is constructed of a relatively thin material such as light gauge stainless steel. The stainless steel, having a relatively low thermal conductivity factor, provides for a low temperature external surface while providing a durable and sanitary construction. The lower edges of the canopy are formed in a V-shape 62 which causes heat convected to the canopy from any heat leakage around the ceiling panel edges to travel around the V and be dissipated before reaching the external exposed surface of the canopy. As shown in FIG. 3, the bottom edge 64 of the canopy 34 extends around the top of the warmer and is spaced therefrom to provide an opening 66 therebetween. The canopy is secured to the ceiling 48 by a pair of screws 67 at each end of the warmer. A washer (not shown) is inserted therebetween to maintain the spacing of the canopy from the ceiling about the perimeter of the warmer.

Also mounted in the warmer chamber 19 and suspended from the ceiling 48 are incandescent light bulbs 68 for illuminating the warmer chamber 19 for display purposes. Preferably, the light bulbs 68 are provided with a protective coating to contain the glass envelope in case of breakage, thereby preventing broken glass or other contaminants from falling on or into the product or product area.

Along the front of the warmer at the bottom of the glass panel 24 is the opening 32 through which air may pass into the warming chamber 19, exiting the warming chamber through a series of louvers 72 in the upper rear panel 50 of the warmer as shown by the arrows 70 in FIG. 3. The flow of air is convective and generally in an upward and rearward direction exiting through the louvers 72 in the vicinity of the sneeze guard 36. This flow of air provides ventilation across the front glass panel 24 to prevent any steaming or fogging of the window from product moisture. The flow of air further aids in reducing the outer surface temperature of the warmer.

A second convective ventilation path exists through the opening 66 between the canopy 34 and the ceiling 48 with the air entering and exiting along the bottom edge 64 of the canopy 34, as shown by the arrows 74 in FIG. 3. This flow of air reduces the outer surface temperature of the canopy. Accordingly, the need for insulation is eliminated thereby eliminating the hazard of such material falling into the product or product area.

Interiorly of the warmer and in close relation to the base are a plurality of pan support racks 76 formed of steel wire welded to form rectangular spacings 78 to accommodate serving pans (not shown). Rack support blocks 80 located at the front of the rack can be removed or hinged upwardly for cleaning of the heating surface 37.

Wiring 82 for the heating elements and lights enters through the rear base conduit 38. Preferably, the two heating units are independently controllable to accommodate a variety of products. Accordingly, separate controls 84 are provided in the rear of the unit for independently controlling the temperature of the base and of the upper radiant heater.

Having thus described my invention, I claim:
1. A countertop display warmer comprising:
transparent front and sides and an open rear,
a base member having a concave outer bottom surface providing a first air space below said warmer,
a ceiling member defining with said base member, said front, and said sides, a warmer chamber,
a canopy mounted over said ceiling member defining a second air space therebetween,
first heating means disposed in said first air space for heating said base member,
second heating means in spaced relation to said ceiling for heating said warmer chamber,
an opening along the lower edge of said front and the upper edge of said rear providing a generally up- wardly and rearwardly directed ventilation path through said warmer chamber, and an opening along the lower edge of said canopy providing a second ventilation path through said second air space.

2. The display warmer of claim 1 wherein said base member, said ceiling member, and said canopy are unitary, sheet metal elements.

3. The display warmer of claim 2 wherein said ceiling joins said front along a transverse edge.

4. The display warmer of claim 2 wherein said canopy is bent inwardly toward said ceiling member at its lower edge to form a V therein.

5. The display warmer of claim 1 wherein said warmer includes an upper, rear panel having a plurality of louvers therein, said ventilation path through said warmer chamber being in through said opening along the lower edge of said front and out said louvers.

6. The display warmer of claim 5 wherein said ceiling joins said front along a transverse edge of said ceiling and said rear along a transverse edge of said rear panel.

7. The display warmer of claim 1 wherein said ventilation path through said warmer chamber passes through the space between said second heating means and said ceiling.

8. A countertop display warmer comprising:

a transparent, generally slanted front, transparent generally trapezoidal-shaped sides, and an open rear, a unitary, sheet metal base member having a concave outer bottom surface providing a first air space below said warmer, a unitary, sheet metal ceiling member having reflective inner surface defining with said base member, said front, and said sides a warmer chamber, a canopy mounted over said ceiling member defining a second air space therebetween and having a bottom edge extending around said warmer, means disposed in said first air space for heating said base member, said means comprising at least one electric heating element in heat exchange relation with the bottom surface of said base member and a heat insulating cover, second heating means in spaced relation to said warmer chamber, an opening along the lower edge of said front and the upper edge of said rear providing a generally upwardly and rearwardly directed ventilation path through said warmer chamber, and an opening along said bottom edge of said canopy providing a second ventilation path through said second air space.

9. The display warmer of claim 8 wherein said base member includes front and rear conduits defining with said base member said first air space and wherein at least said front conduit includes a plurality of openings in the front surface thereof to restrict the flow of heat from said base member thereto.

10. The display warmer of claim 8 wherein said second heating means comprises an electric radiant heater including a reflector and radiant heating element.

* * * * *